United States Patent [19]

Kendig et al.

[11] Patent Number: 4,803,413
[45] Date of Patent: Feb. 7, 1989

[54] MAGNETIC ISOLATING AND POINTING GIMBAL APPARATUS

[75] Inventors: John R. Kendig, Peoria; William R. Hibble; James A. Kiedrowski, both of Phoenix, all of Ariz.

[73] Assignee: Honeywell Inc., Minneapolis, Minn.

[21] Appl. No.: 885,627

[22] Filed: Jul. 15, 1986

[51] Int. Cl.$^4$ ............................................. B64C 17/02
[52] U.S. Cl. .................................. 318/648; 318/632; 318/689; 74/5.4
[58] Field of Search ............... 318/648, 649, 602, 689, 318/632; 74/5.4, 5.6

[56] References Cited

U.S. PATENT DOCUMENTS

| | | | |
|---|---|---|---|
| 3,875,488 | 4/1975 | Crocker | 318/648 |
| 4,088,018 | 5/1978 | Anderson et al. | 73/178 R |
| 4,403,838 | 9/1983 | Beilock | 350/500 |
| 4,498,038 | 2/1985 | Malueg | 318/648 |
| 4,6445,994 | 2/1987 | Giangola | 318/649 |

OTHER PUBLICATIONS

Control System Design of Annular Suspension and Pointing System, Journal of Guidance, and Control, vol. 3, No. 1, Jan.-Feb. 1980

Primary Examiner—Benjamin Dobeck
Attorney, Agent, or Firm—Seymour Levine; Albin Medved

[57] ABSTRACT

A magnetic isolation and pointing gimbal apparatus provides support functions and multidegree of freedom pointing capability and simultaneous six degree of freedom bi-directional disturbance isolation. This is accomplished by integrating the support, isolation and pointing functions within one contiguous gimbal assembly. The apparatus comprises a housing having a shaft rotatably mounted therein such that the centroidal axis of the shaft is coaxial with that of the housing. A linear, two-axis, large gap, radial magnetic actuator is mounted in the housing concentrically with the shaft. A radial armature is mounted on the shaft adjacent the radial magnetic actuator. A set of linear, large gap, axial magnetic actuators are mounted in the housing. An axial armature is connected to the shaft and extends between the axial magnetic actuators. A torque motor is also connected to the shaft. A large gap, rotational position sensor has a first portion connected to the shaft and a second portion connected to the housing.

19 Claims, 8 Drawing Sheets

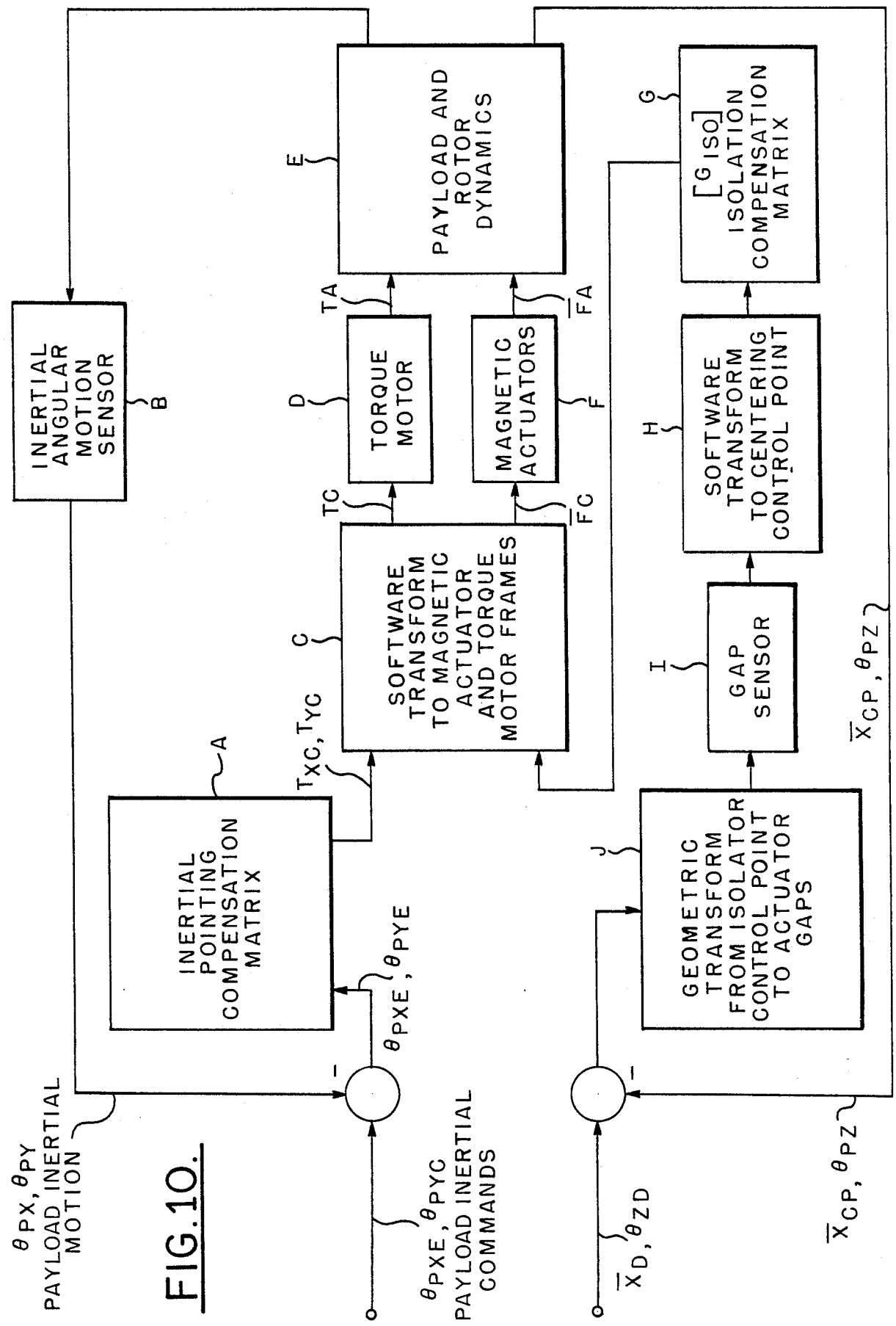

MAGNETIC ISOLATING AND POINTING GIMBAL APPARATUS

BACKGROUND OF THE INVENTION

1. Field of the Invention

This invention relates to magnetic suspension vibration isolation for gimbal systems used in conjunction with spatial reference or pointing systems. More particularly, it relates to a magnetic suspension which provides a single magnetic gimbal with a six degrees of freedom pointing and bidirectional vibration isolation capability.

2. Background Description

Spacecraft pointing system performance can be significantly affected by disturbances generated by the spacecraft. This is particularly true for systems with very stringent pointing stability requirements; for example, less than one arc second.

To achieve precision pointing stabilities of less than one arc second, it is sometimes required to vibrationally isolate the pointing system from spacecraft generated disturbances and to facilitate the pointing control function in the presence of gimbal structure flexibility. An isolator is required to attenuate vibration over as many as six degrees of freedom; three linear and three rotational axes. Vibration levels are typically of such a magnitude as to require a linear motion capability of at least +0.050 inches in each axis.

One approach has been to utilize a base mounted isolation configuration wherein a pair of pointing system gimbals are mounted between the payload and a vibration isolator. The vibration isolator can comprise either passive or active elements. The passive elements may include, for example, springs and fluid, visco-elastic and magnetic dampers. Active elements may include linearized magnetic actuators and position or velocity sensors with electronic control loops. The gimbals may be supported with either ball bearings or magnetic bearings. The inertial pointing requirements of such a system are shared by the gimbals wherein each gimbal provides freedom only about a single particular axis. The additional compliance represented by this approach may make the gimbal control function more difficult.

Another approach is a payload isolation configuration which utilizes the same gimbal system as the base mounted isolation configuration. The vibration isolator is mounted between the payload and the gimbals. However, the inertial pointing requirements are now shifted from the gimbals to the actuators providing the isolation control. These actuators provide three degrees of pure translational isolation, two degrees of inertial pointing and a third degree of rotational control that may be pure isolation or pointing. The gimbals are controlled to minimize the angular motion between the isolated payload and the gimbal set. The increased control complexity of the payload isolation configuration is offset by a reduction in the pointing control sensitivity to gimbal structural flexibility. Also, the effects of payload mass offset on pointing error can be more precisely controlled in this configuration.

An example of the payload isolation configuration is the well-known Annular Suspension and Pointing System (ASPS), which employs linearized mangetic actuators for isolation and pointing control. This system provides 0.01 arc second pointing stability to payloads while being subjected to spacecraft vibration disturbances. The pointing system gimbals are supported by ball bearings with freedom about only a singular axis for each gimbal. The vibration isolator and vernier pointing system add-ons contain active elements with electronic control loops. The active elements are linearized magnetic actuators and linear position sensors, each with substantial mechanical clearances. These and the electronic control loops are configured to provide six degrees of freedom vibration isolation and vernier pointing capabilities.

A major limitation of these base and payload configurations is that, as add-ons to the gimbal system, they require additional space, weight and power which are all critical factors in spacecraft applications. Even where passive mechanisms are used for the base configuration, there is a volume and weight penalty.

The foregoing illustrates limitations known to exist in present devices. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

The present invention is a magnetic isolation and pointing gimbal whereby the pointing axis support, pointing capability, and six degree of freedom bidirectional vibration isolation are provided in an integral assembly which minimizes control complexity, weight, power and volume. One aspect of the present invention is accomplished by providing a magnetic isolation and pointing gimbal apparatus including a housing having a shaft rotatably mounted therein such that the centroidal axis of the shaft extends coaxially within the housing. A linear, two-axis, large gap radial magnetic actuator is mounted in the housing concentrically with the shaft. A radial armature is mounted on the shaft adjacent the radial magnetic actuator. A set of linear, large gap, axial magnetic actuators are mounted in the housing. An axial armature is connected to the shaft and extends between the axial magnetic actuators. A torque motor is also connected to the shaft. A large gap, rotational position sensor has a first portion connected to the shaft and a second portion connected to the housing.

The foregoing and other aspects will become apparent from the following detailed description of the invention when considered in conjunction with the accompanying drawing. It is to be expressly understood, however, that the drawing is not intended as a definition of the invention but is for the purpose of illustration only.

BRIEF DESCRIPTION OF THE DRAWING

In the drawing:

FIG. 10 illustrates an embodiment of a functional control block diagram for the configuration in FIG. 8.

DESCRIPTION OF THE PREFERRED EMBODIMENT

Figure 1:
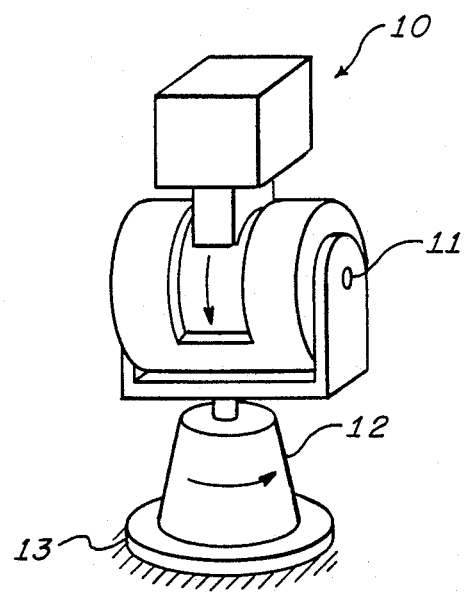
FIG. 1 is a diagrammatic view illustrating an embodiment of an exemplary gimbal set mounted on a structural interface and supporting a payload package.

Referring to FIG. 1 the numeral 11 designates the magnetic isolating and pointing gimbal which replaces a conventional gimbal and isolator and supports a payload 10 which must be precision pointed and simultaneously isolated from vibration disturbances. The magnetic gimbal 11 is attached to a conventional gimbal 12, for multi-axis coarse pointing or directly to the structural interface 13, depending upon requirements. It is at the structural interface 13 that the primary sources of vibration disturbances are present which are attenuated by the magnetic gimbal 11 so as to allow the vibration sensitive payload 10 to properly operate and be pointed. With gimbal 11 positioned as shown in FIG. 1, secondary disturbances may also be emitted by gimbal 12 which require attenuation by magnetic gimbal 11.

Figure 2:
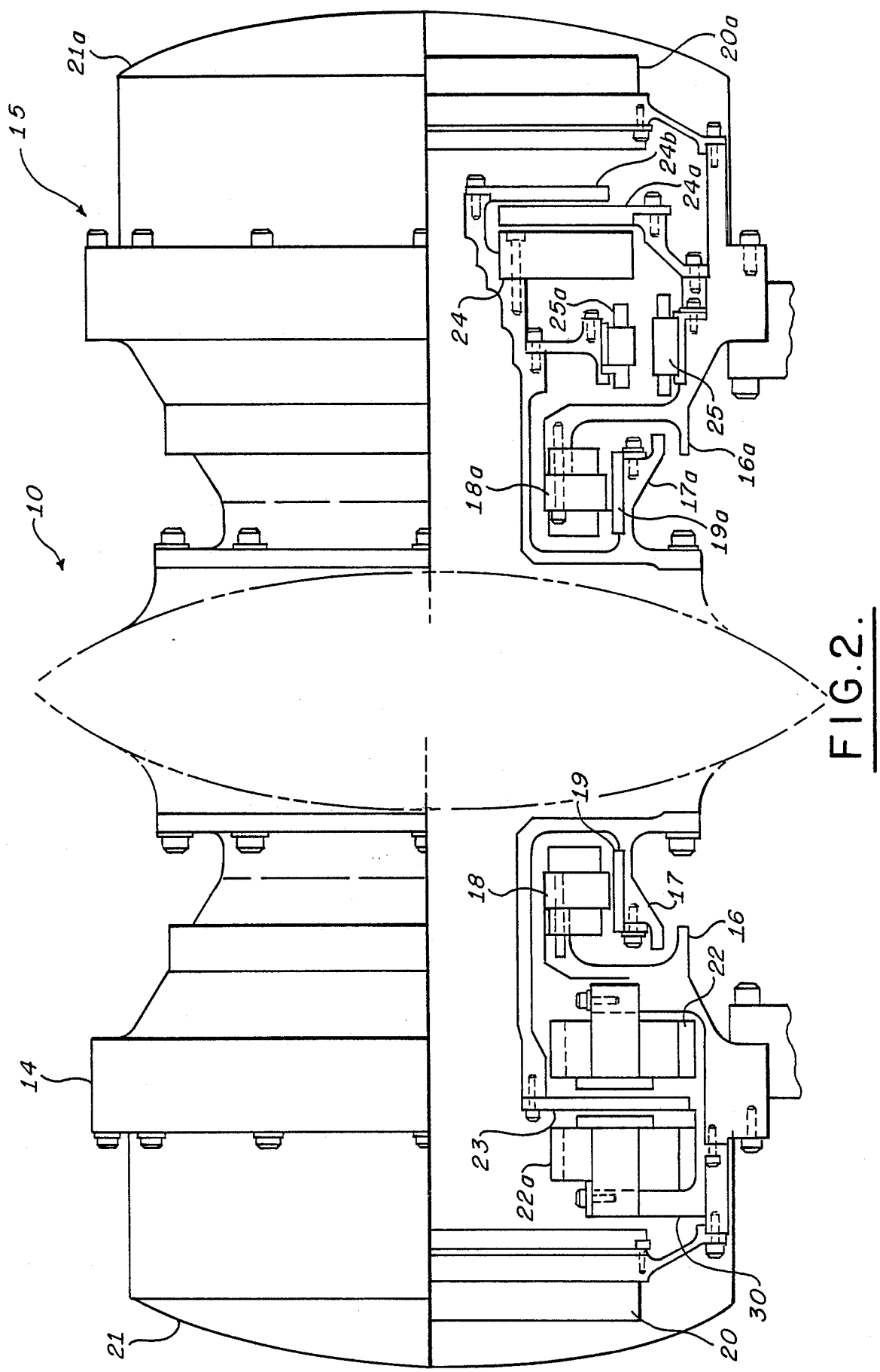
FIG. 2 is a side elevational view in partial cross-section illustrating an embodiment of the present invention showing a two module gimbal configuration including an axial and a torque module, with the payload interface between the modules.

The details of how this invention would be applied to the system of FIG. 1 to replace a conventional gimbal assembly and separate isolator is shown in FIG. 2. Referring to FIG. 2 the magnetic gimbal assembly 11 is attached to the vibration and pointing sensitive payload 10. In this embodiment, the gimbal assembly is split into two modules, an axial module 14 and a torque module 15. As shown, these provide for mounting through the center of mass of payload 10. However, the gimbal 11 could also be configured to attach to a payload structure and allow the payload 10 to be offset from the gimbal axis. Each module 14 and 15 respectively incorporates a housing 16, 16a, a shaft 17, 17a, a linear, two axis, large gap radial magnetic actuator 18, 18a, a radial armature 19, 19a, a sensor electronics package 20, 20a, and a cover 21, 21a. Also incorporated but not shown are position and magnetic flux sensors. Depending on the embodiment, the electronics package 20 can be mounted elsewhere, for example with any other electronics, not herein shown. The axial module 14 incorporates a set of linear large gap axial magnetic actuators 22 and 22a and an axial armature 23. The torque module 15, in addition to the items already mentioned, includes a large gap ironless armature brushless DC torque motor 24, 24a and 24b, and a large gap rotational position resolver 25 and 25a.

The torque motor 24, 24a, 24b is a brushless DC ironless armature motor. The ironless armature concept, whereby the windings are separated from all iron content, results in the absence of radial forces that would otherwise interfere with the suspension performance. The motor provides a torque directly proportional to the excitation current and thus does not require the flux density feedback or bias current linearization. It also incorporates large radial clearance to enable the cross-axis motions. One such torque motor 24, 24a, 24b, is manufactured by Sperry Corporation, Aerospace Marine Group, Durham, N.C. under Part No. 2960559.

Support and levitation of the payload 10 are provided in two degrees of freedom by operating the radial actuators 18, 18a, in parallel. The remaining translational support is provided by the operation of the axial actuators 22 and 22a. Rotation in two degrees of freedom is provided by operating the radial actuators 18, 18a, differentially. The remaining rotational degree of freedom is controlled by the torque motor 24, 24a and 24b. Control of the magnetic actuators 18, 18a, 22 and 22a is through magnetic flux sensors, although force or position sensors could be used. Position sensors are used to center the magnetic armatures 19, 19a and 23 in the actuator gaps. These sensors can be either eddy current, inductive, capacitive or optical. Pointing control about two degrees of freedom and translational control about three degrees of freedom can be provided by the use of these position sensors. Cummutation of the torque motor 24, 24a and 24b is accomplished by internal Hall effect devices, resolver, encoder, or could be eliminated or small angle motion. Depending upon requirements, the brushless DC motor 24, 24a and 24b can be replaced with an AC induction motor. Position sensing for the torque motor degree of freedom is provided by a large gap position resolver 25 and 25a. The output from this resolver 25 and 25a can be used to generate the error signal in a gimbal angle control loop or can be used for position readout for applications other than gimbal angle control. Signals from an external sensor can also be used to generate gimbal torque commands. If required the resolver 25 and 25a could be replaced by any angular position sensor, such as an angular encoder. Isolation in all six degrees of freedom is provided by the large magnetic gaps, and the low bandwidths of the control loops. The use of these linearized magnetic actuators 18, 18a, 22 and 22a permits operation of the magnetic gimbal 11 over a large fraction of the air gap and provides very linear force to force command control for system decoupling. The use of the large gap ironless armature torquer 24, 24a and 24b provides accurate and linear force to force command control independent of the gap position and at low speeds. This type of motor also eliminates the actuator cross-coupling compensation which must be employed with other motor types.

Figure 3:
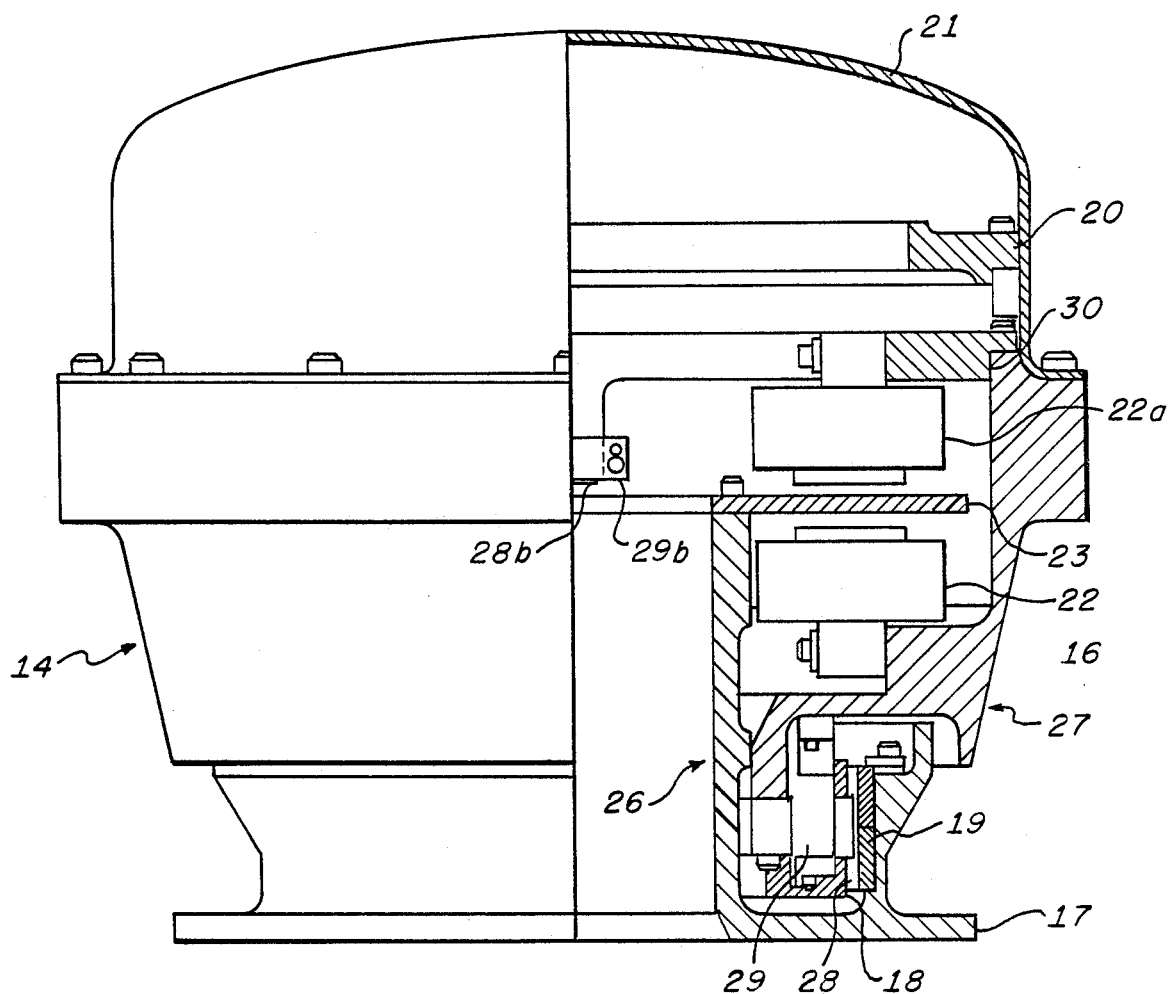
FIG. 3 is a sectional view illustrating an embodiment of the axial module of FIG. 2 with the magnetic actuator position sensors shown and illustrating the functioning of the integral motion limiting support structure.
Figure 4:
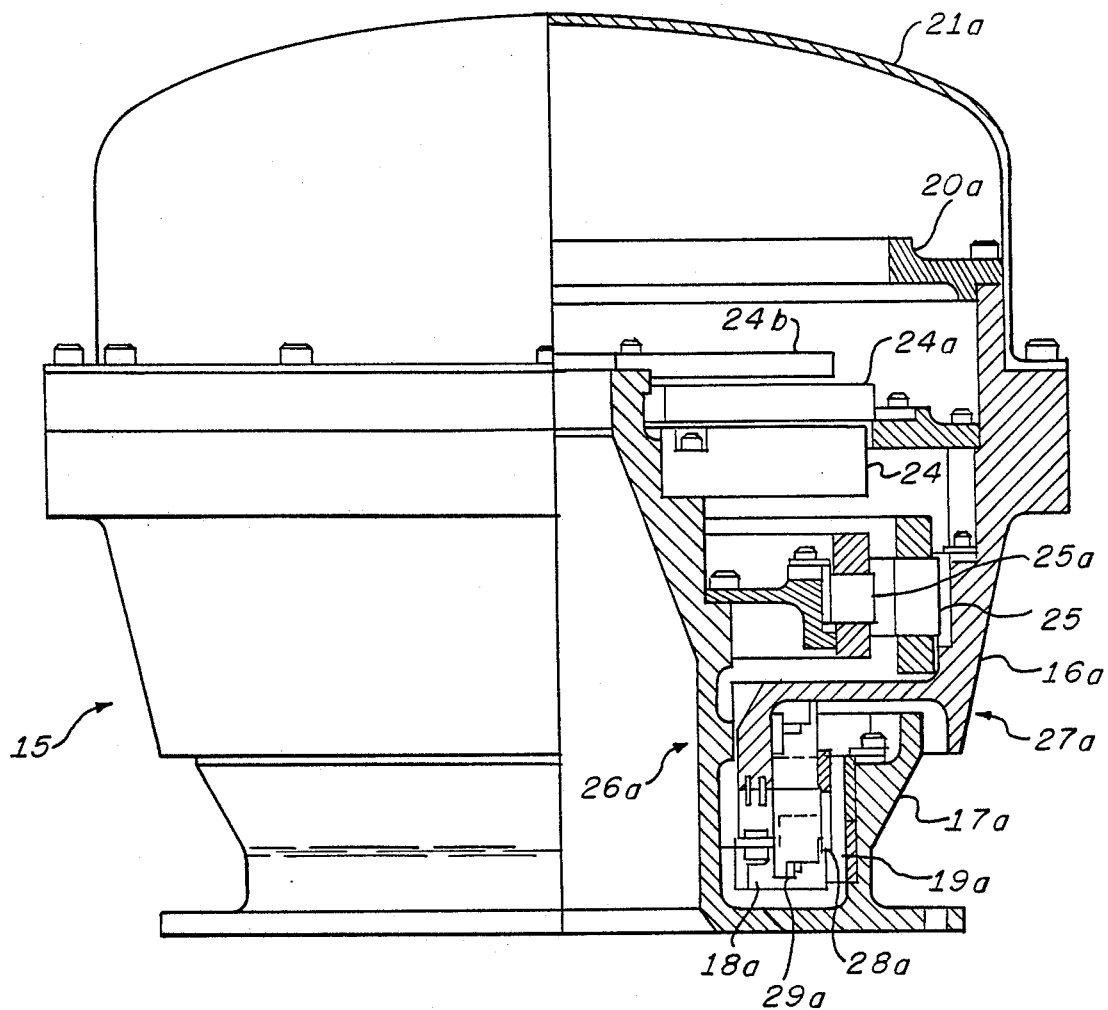
FIG. 4 is a sectional view illustrating an embodiment of the torque module of FIG. 2 with the position sensors shown.
Figure 5:
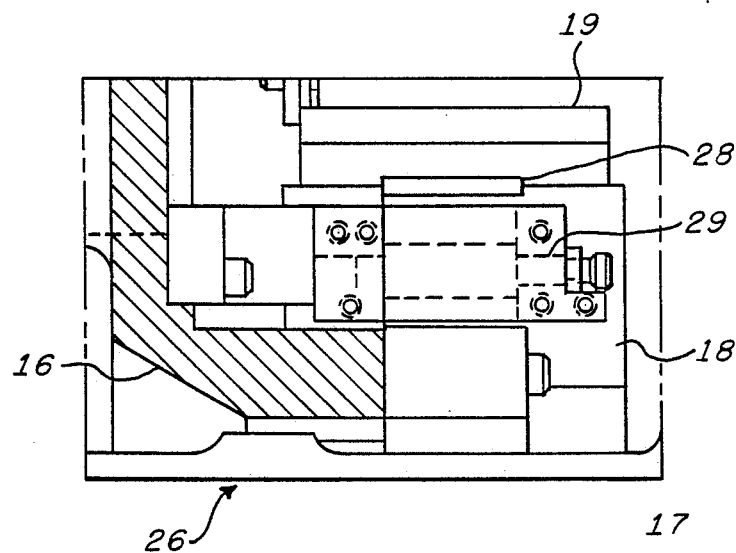
FIG. 5 is an enlarged view of Detail A taken from FIGS. 3 and 4 illustrating detail of the radial position sensors.
Figure 6:
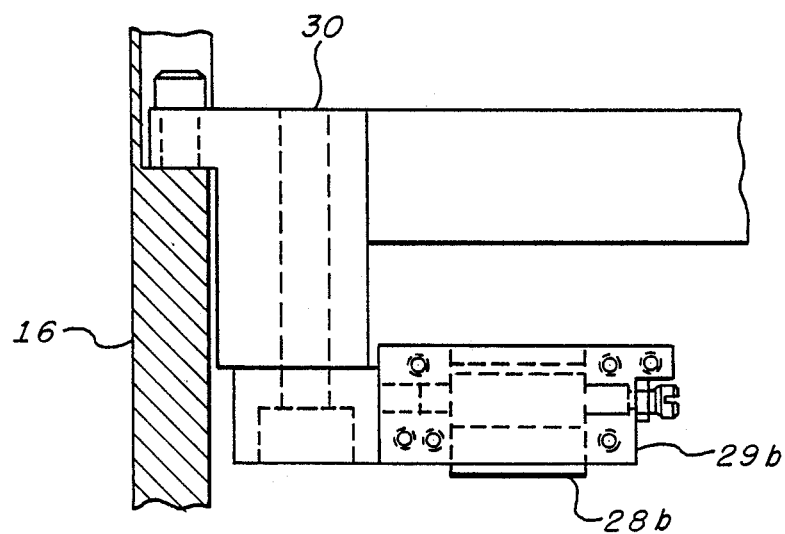
FIG. 6 is a sectional view taken along line A—A of FIG. 3 illustrating the detail of the axial position sensor.

Referring now to FIGS. 3 and 4, the location of position sensors 28, 28a and 28b for this embodiment are shown. To sense the position for the radial actuator 18, 18a the sensors 28 28a, are integrated into adjustable holders 29, 29a which are in turn mounted to the housing 16, 16a and sense the radial armature 19, 19a. This is shown in greater detail in FIG. 5. To sense the axial position, the sensors 28b are mounted in the holders 29b and are positioned to sense the axial armature 23. In this case an intermediate plate 30 is used to mount to the housing 16 and to locate the axial actuators 22a and the sensors 28b relative to the axial armature 23. This is better shown in FIG. 6. If other sensors are used, the holders 29, 29a and 29b and the mounting would change to accomodate the devices used.

Again referring to FIGS. 3 and 4, the motion of the levitated shafts 17, 17a and the payload 10 are constrained by a series of interlocking surfaces which function as stops 26, 26a and 27, 27a. Although not shown in the figures, a series of interlocking tabs can be incorporated in the surfaces of 27, 27a to function as an integral caging structure to rigidly tie and shafts 17, 17a to the housings 16, 16a for nonoperation events. Although the stops and caging structure are integral with this embodiment, they need not be and can be added on as separate assemblies.

FIG. 3 shows the relative positions of the opposed large gap axial actuators 22 and 22a and position sensors 28b with respect to the axial armature 23. In this view the entire levitated assembly is shown translated to the left. By comparing the stop surfaces 27 of FIG. 3 to those of 27a in FIG. 4 the function of these surfaces as motion limiters can be better understood.

FIG. 4 shows the torque module 15. The radial actuator 18a and sensor 28a mounting and functions are as defined for the axial module. The difference lies in replacing the axial actuators 22 and 22a with large gap position resolver 25 and 25a and ironless armature torque motor 24, 24a and 24b. The view in this diagram shows the levitated assembly centered in the magnetic gaps.

Figure 7:
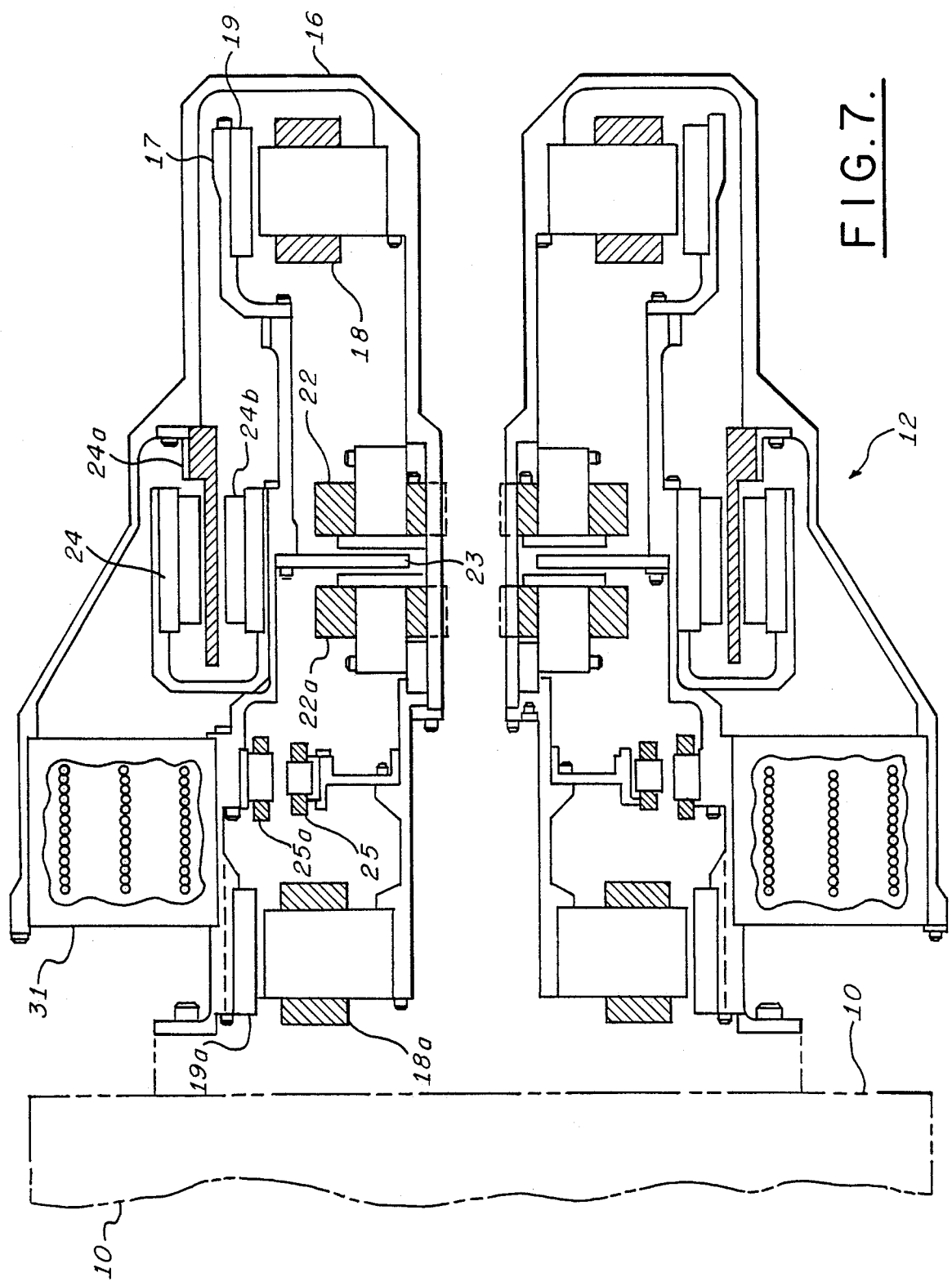
FIG. 7 is a sectional view illustrating an embodiment of a single module gimbal configured as an alternative to the two module approach shown in FIG. 2.

FIG. 7 shows an alternative to the gimbal configuration of FIG. 2 for gimbal 11, or could be used for the base gimbal 12 of FIG. 1. FIG. 7 incorporates in one compact module, a shaft 17 attached to a payload 10, a housing 16, two linear, two-axis, large gap radial magnetic actuators 18, 18a which provide translations and rotations in two axes, a radial armature 19, 19a, an axial armature 23, a set of linear, large gap, axial magnetic actuators 22, 22a to provide translational control in the third translational degree of freedom, a large gap ironless armature torque motor 24, 24a, 24b to provide control about the third rotational axis, and a large gap resolver 25, 25a which provides rotational sensing about the gimbal axis. Not shown are control sensors or the position sensors used to center the magnetic armatures 19, 19a, 23, 24 and 24b in the magnetic gaps of the actuators. Also shown is an electrical cable assembly 31 which provides for electrical connections across the magnetic gaps. These could also be not only electrical cabling but fiberoptic cables, optical transmitters, transformers, tuned cavities, or capacitive couplers.

FUNCTIONAL CONTROL CONFIGURATIONS

The functional control loop structure for a system utilizing the magnetic isolating and pointing gimbal depends on the pointing objective of the original gimbal system, and, on which standard gimbal is replaced with the magnetic gimbal. As with the add-on isolation systems, the complexity of the magnetic control loops for the magnetic gimbal system depends, in general, on how close the magnetic interface is placed with respect to the payload. Two configurations, shown in FIGS. 8 and 9 that have been considered for application of the magnetic isolating and pointing gimbal can be used to illustrate this control loop variability.

Figure 8:
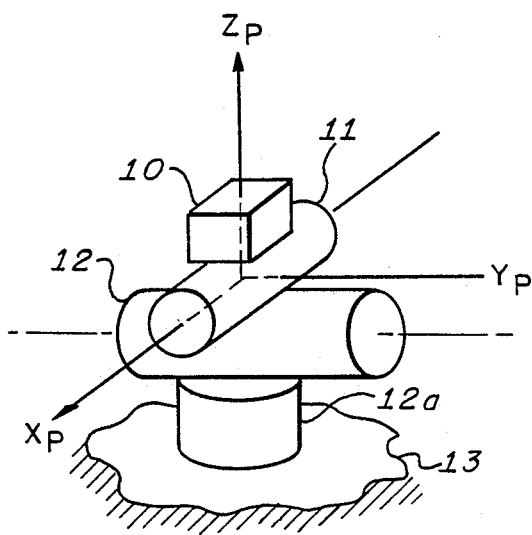
FIG. 8 diagrammatically illustrates an embodiment of a three gimbal stack in which the top gimbal closest to the payload is a magnetic gimbal.

In configuration 1., FIG. 8, the magnetic gimbal 11 is placed at the top of the gimbal stack and serves as the payload 10 attach structure. Inertial pointing of the payload 10 around the $X_P$ and $Y_P$ axis as shown in the figure is achieved using the radial magnetic actuators for the $Y_P$ axis and the torque motor for the $X_P$ axis. The second level gimbals 12, 12a, are used to followup on the radial gaps of the magnetic gimbal 11. To provide isolation in the other four degrees of freedom the radial and axial actuators provide translational and $Z_P$ axis rotational positioning of the gimbal rotor with respect to the gimbal stator.

In the functional block diagram of FIG. 10 the separate pointing and positioning functions are shown by the upper and lower control loops respectively. The driving terms for the bottom loop, $\overline{X}_D$ and $\theta_{ZD}$, represent the translational and $Z_P$ axis rotational motion of the stator side of the magnetic gimbal at the control point. The centering control point referred to in the diagram can be arbitrarily chosen, but is most conveniently defined as the centroid of the rotor.

Isolation characteristics of the four centering loops, defined by the transform from disturbance input to payload motion, is determined largely by the form of isolator compensators. Disturbance isolation around the inertial pointing axes is determined by the bandwidth of the inertial compensators and by the accuracy of payload disturbance torque estimates.

The block of FIG. 10 include an inertial pointing compensation matrix function designated A. This is a control compensation block and is identified as a matrix (with two inertial error signals $\theta_{PXE}$, $\theta_{PYE}$, as input and two torque commands $T_{XC}$, $T_{YC}$, as output) the compensation block is likely to consist of two single channel compensators, one for each pointing control axis. Compensation may be implemented in analog circuitry or in an on board digital processor.

An inertial angular motion sensor function is designated B and is a sensor to detect payload inertial motion. Outputs $\theta_{PX}$, $\theta_{PY}$, from the sensors provide the signals one for each pointing axes, on which the pointing loops are closed. A likely candidate for the motion sensor is a strapdown gyro package.

A software transform to magnetic actuator and torque motor frames function is designated block C. This is a computation block which takes pointing torque commands in the payload inertial frame and isolation force and torque commands in the payload frame and generates torque commands for the gimbal motor and force commands for the radial and axial magnetic actuators. While referred to as a software transform, the block can be implemented in analog circuitry. The transform is determined by the orientation and position of each of the actuators and of the gimbal motor in the payload frame and will be a function of the upper gimbal angle.

Torque motor 24, 24a, 24b is designated as a function by block D and is provided for actuation around the upper or magnetic gimbal axis $X_P$ as shown in FIG. 8.

A payload and rotor dynamics function is designated block E and provides equations of motion for the payload and the rotor side of the upper gimbal structure.

Radial and axial magnetic actuators, 18, 18a, 22 and 22a respectively, are designated as function by block F. These are force actuators for controlling the payload in translation and around axes $Y_P$ and $Z_P$ normal to gimbal axis $X_P$.

An isolation compensation matrix function is designated block G and includes a single compensation filter for each isolation channel, three translation and one rotation around the payload line of sight.

A software transform to centering control point function is designated block H and is a transformation matrix relating relative motion at the magnetic interface as detected by the gap sensors to payload motion (with respect to the stator structure) at the payload isolation control point (a point fixed with respect to the payload).

Gap sensor 28, 28a, 28b is designated as function by block I. These are (as discussed above) proximity devices used to measure the motion of the magnetic actuator armatures with respect to the actuator stators.

A geometric transform from isolation control point to actuator gaps function is designated block J. This represents physical transformation (as opposed to the software transformation) relating motion at the isolation control point (noted in block G) to relative motion at the actuators. This is the inverse of the transformation in block G.

Figure 9:
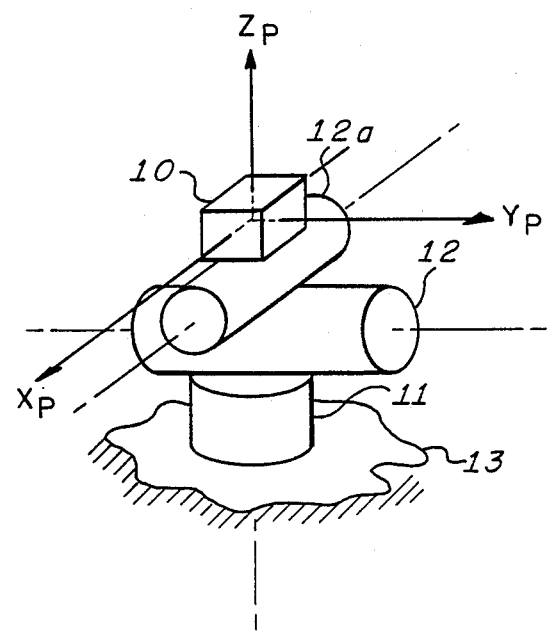
FIG. 9 diagrammatically illustrates an embodiment of a three gimbal stack in which the bottom gimbal is a magnetic gimbal.

The second example configuration, FIG. 9, employs the magnetic gimbal 11 between the two standard gimbals 12, 12a, used for inertial pointing and the gimbal support structure 13. In this configuration the base or magnetic gimbal 11 is used only for maneuvers to prevent the angle between the payload $Y_P$ axis and the gimbal 12 axis from growing too large. In inertial pointing mode the magnetic gimbal angle is positioned to a fixed value. The remaining five degrees of freedom of the magnetic gimbal rotor are controlled with magnetic centering loops. Thus, all magnetic gimbal loops have the same relative positioning control objective.

Figure 11:
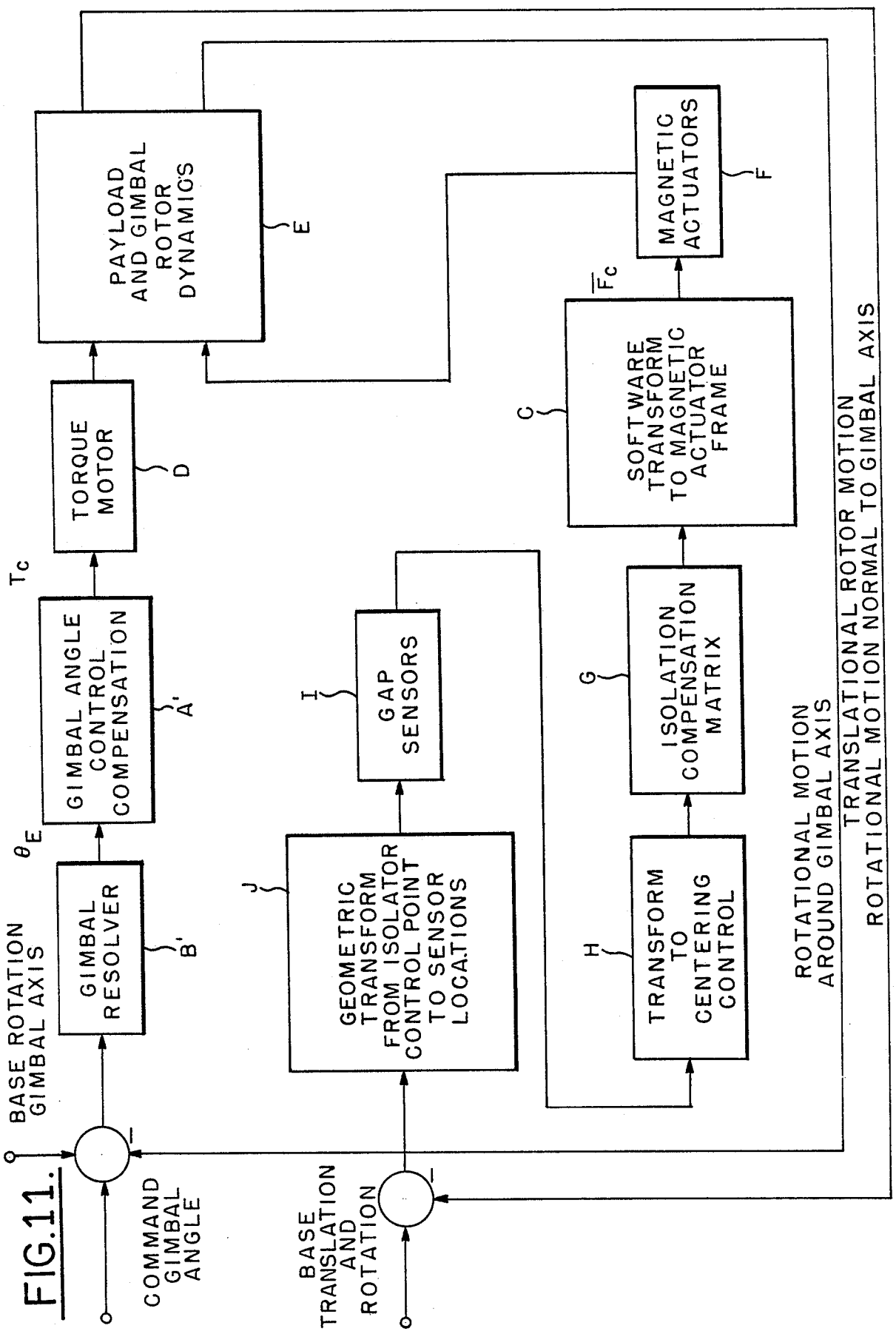
FIG. 11 illustrates an embodiment of a functional control block diagram for the configuration in FIG. 9.

FIG. 11 shows a functional block diagram of the magnetic gimbal control loops for the second configuration. Isolation characteristics in the five magnetic actuator control axes are determined by the isolation compensation matrix which may be implemented digitally or in analog circuitry.

The configuration of FIG. 11 represents a gimbal pointing mode of operation for the magnetic gimbal. In this configuration the magnetic actuators are used solely for isolation. The gimbal motor is used to drive the bottom gimbal to some commanded gimbal orientation. FIG. 11 includes the same function blocks C–J as have been described in FIG. 10. Block $A^1$ of FIG. 11 replaces block A of FIG. 10 and, block $B^1$ of FIG. 11 replaces block B of FIG. 10. However, it should be noted that each of the isolation transform blocks shown in FIG. 11 must account for an angular centering (or isolation) control loop around the axes normal to the magnetic gimbal axis.

A gimbal angle control compensation function is designated block $A^1$ and includes the control compensation filter for the gimbal angle control loop. The compensation may be implemented in a control processor in analog circuitry.

Resolver 25, 25a is designated as a function by block $B^1$ and includes a device for outputting gimbal angle control error, $\theta_E$. Error angle is generated by exciting the sine and cosine windings of the resolver with the sine and cosine, respectively, of the command gimbal angle.

The foregoing has described a magnetic isolation and pointing gimbal apparatus providing an improvement in gimbal systems. It provides not only support functions but also provides multidegree of freedom pointing capability and simultaneous six degree of freedom bi-directional disturbance isolation. By integrating the support, isolation and pointing functions within one contiguous assembly, a major savings in mechanical, structural, electrical and control systems impact and complexity can be made in comparison to separate isolator and gimbal assemblies.

The savings are realized by replacing one of the standard gimbals with a magnetic gimbal comprising a configuration of radial and axial magnetic actuators arranged with respect to the gimbal axis of rotation. The actuators and the associated control circuits thus provide frictionless rotary bearings at the gimbal radial and axial interface which allows relative and inertial rotation control normal to the gimbal axis. Rotational control around the gimbal axis itself is provided by an ironless armature DC motor. The control loops for the magnetic gimbal are similar to those employed with the magnetic add-on systems. However, because the gimbal control replaces one of the interface loops, the total number of control loops required when using the magnetic gimbal is one less than the number required when using an add-on system.

Having thus described the invention, what is claimed is:

1. A magnetic isolation and pointing gimbal apparatus, comprising:
   a housing;
   a shaft rotatably mounted in the housing and having a centroidal axis extending coaxially within the housing;
   a linear, two-axis, large gap, radial magnetic actuator mounted in the housing concentically with the shaft;
   a radial armature mounted on the shaft adjacent the radial magnetic actuator;
   a set of linear, lrge gap, axial magnetic actuators mounted in the housing;
   an axial armature connected to the shaft and extending between the axial magnetic actuators;
   a torque motor connected to the shaft; and
   a large gap, rotational position sensor having a first portion connected to the shaft and a second portion connected to the housing.

2. The apparatus of claim 1 wherein the housing includes a first module connected to a payload and a second module connected to the payload opposite the first module.

3. The apparatus of claim 2 wherein each module further includes:
   a sensor electronics package; and
   a cover 4. The apparatus of claim 2 wherein the first module contains the set of linear, large gap, axial magnetic actuators and the axial armature extending therebetween.

5. The apparatus of claim 4 wherein the second module contains the torque motor and the large gap rotational position sensor.

6. The apparatus of claim 2, including:
   interlocking stops connected respectively, to the shaft and housing.

7. The apparatus of claim 2, including
   adjustable holders connected to the radial magnetic actuator;
   means mounted in the holders for sensing the radial armature; and
   means mounted in the holders for sensing the axial armature.

8. The apparatus of claim 7, including:
   means mounted in the housing for locating the axial magnetic actuators and the axial armature sensing means relative to the axial armature.

9. A magnetic isolation and pointing gimbal apparatus, comprising:

a housing including an axial module connected to one side of a payload and a torque module connected to an opposite side of the payload;

a shaft rotatably mounted in the housing and having a centroidal axis extending coaxially within the housing;

a linear, two axis, large gap, radial magnetic actuator mounted in the housing concentrically with the shaft;

a radial armature mounted on the shaft adjacent the radial magnetic actuator;

a set of linear, large gap, axial magnetic actuators mounted in the axial module;

an axial armature in the axial module, connected to the shaft and extending between the axial magnetic actuators;

a torque motor in the torque module connected to the shaft; and a large gap, rotational position sensor in the torque module, having a first portion connected to the shaft and a second portion connected to the housing.

10. The apparatus of claim 9 further including:
a sensor electronics package; and
a cover.

11. The apparatus of claim 9, including:
interlocking stops connected, respectively, to the shaft and housing.

12. The apparatus of claim 9, including:
adjustable holders connected to the radial magnetic actuator;
means mounted in the holders for sensing the radial armature; and
means mounted in the holders for sensing the axial armature.

13. The apparatus of claim 12, including:
means mounted in the housing for locating the axial magnetic actuators and the axial armature sensing means relative to the axial armature.

14. A magnetic isolation and pointing gimbal apparatus, comprising:
a housing including an axial module connected to one side of a payload and a torque module connected to an opposite side of the payload;

a shaft rotatably mounted in the housing and having a centroidal axis extending coaxially within the housing;

a linear, two axis, large gap, radial magnetic actuator mounted in the housing concentrically with the shaft;

a radial armature mounted on the shaft adjacent the radial magnetic actuator;

a set of linear, large gap, axial magnetic actuators mounted in the axial module;

an axial armature in the axial module, connected to the shaft and extending between the axial magnetic actuators;

a torque motor in the torque module connected to the shaft;

a large gap, rotational position sensor in the torque module, having a first portion connected to the shaft and a second portion connected to the housing;

a sensor electronics package mounted in each of said modules; and a cover mounted on each of said modules adjacent said sensor electronics package.

15. The apparatus of claim 14, including:
interlocking stops connected, respectively, to the shaft and the housing.

16. The apparatus of claim 14, including:
adjustable holders connected to the radial magnetic actuator;
means mounted in the holders for sensing the radial armature; and
means mounted in the holders for sensing the axial armature.

17. The apparatus of claim 16, including:
means mounted in the housing for locating the axial magnetic actuators and the axial armature sensing means relative to the axial armature.

18. The apparatus of claim 1 wherein the housing includes a single module connected to a payload.

19. The apparatus of claim 1 further including:
means for coupling the magnetic and isolation pointing gimbal to a payload;
means for detecting inertial motion and pointing of the payload relative to preselected axes of the magnetic and isolation pointing gimbal;
means for providing compensation for the inertial pointing of the payload relative to the preselected axes.

* * * * *